Apr. 24, 1923.
B. RÆDER
ZINC SMELTING FURNACE
Filed Feb. 5, 1920
1,452,934
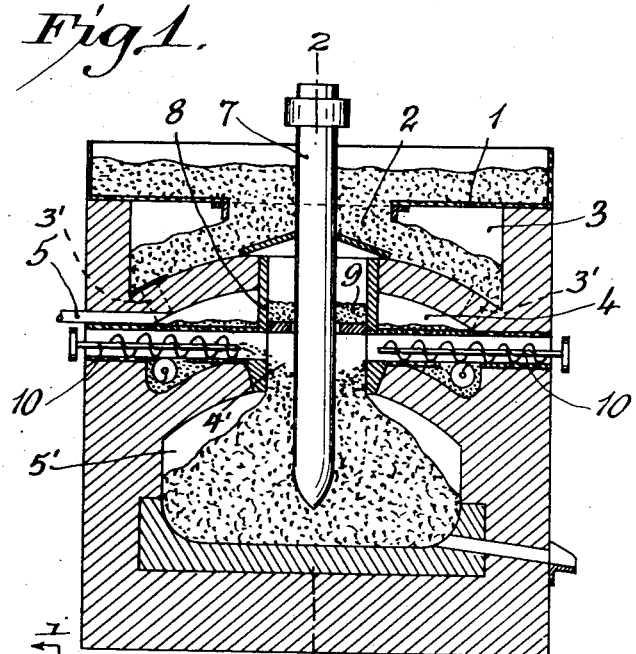
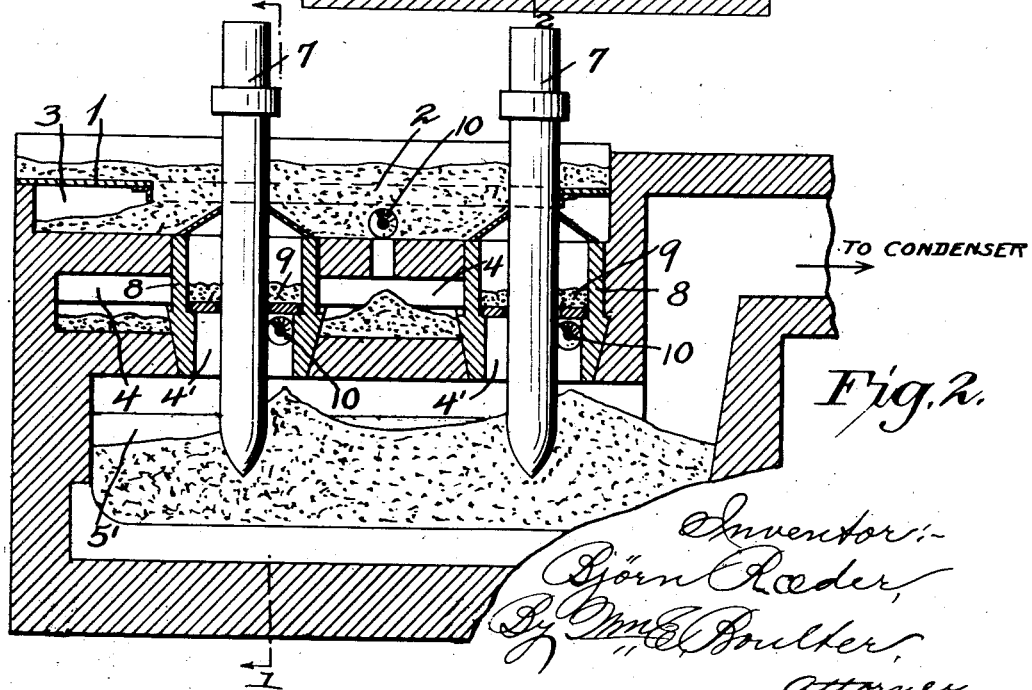
Inventor:—
Björn Ræder,
By Orm E. Poulter,
Attorney Patented Apr. 24, 1923.

1,452,934

UNITED STATES PATENT OFFICE.

BJÖRN RÆDER, OF KYKKELSRUD, ASKIM STATION, NORWAY, ASSIGNOR TO HIMSELF AND AKTIESELSKAPET ZINK, BOTH OF KYKKELSRUD, ASKIM STATION, NORWAY.

ZINC-SMELTING FURNACE.

Application filed February 5, 1920. Serial No. 356,515.

*To all whom it may concern:*

Be it known that I, BJÖRN RÆDER, a subject of the King of Norway, residing at Kykkelsrud, Askim Station, Norway, have invented a certain new and useful Improvements in a Zinc-Smelting Furnace; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

By the production of zinc in electric furnaces it has been found to be of importance to expose the charge to a preliminary drying and heating treatment before feeding it into the reduction chamber, and this drying and heating preferably takes place by means of carbon monoxide gases developed in the furnace.

The present invention has for its object an electric zinc smelting furnace of the kind where the electric current is supplied through carbon electrodes dipping into the slag-bath, said furnace being provided above the reduction chamber with a heating and drying furnace, which is heated by combustion of gas, such as carbon monoxide developed during the smelting process.

In the drawings, Figure 1 is a vertical section on line 1—1 of Fig. 2, of a furnace constructed in accordance with my invention. Figure 2 is a similar section on line 2—2 of Fig. 1, the electrodes being shown in elevation. The furnace illustrated comprises three superposed chambers, of which the top chamber is a preliminary drying chamber without separate heating means. The next chamber is a preheating and glowing chamber, and the bottom compartment is a reduction chamber consisting of a closed electric furnace.

Each compartment may be divided in two or more superposed chambers, and the electrodes project through all the superposed chambers from the top into the bottom or reduction chamber.

The charge is first placed on an open drying plate 1, from which it is fed through a central opening 2 into a closed drying chamber 3 heated from the lower compartments and by means of combustion gases from the flame chamber.

From this drying chamber the charge is fed through openings 3' into the glowing or heating chamber 4, which is constructed as a flame furnace and is supplied with carbon monoxide gas from the condensors or from other sources through the gas supply pipe 5.

In this heating chamber the charge is heated red hot and is finally conducted through suitable opening 4' in the bottom of the flame chamber into the reaction chamber 5' itself, which is heated by electric current supplied in the usual manner by means of electrodes 7.

In order that the electrode shall not be exposed directly to the hot temperature of the flame chamber, it is surrounded by a sleeve or tube 8.

For the feeding of the charge from the flame chamber to the electric furnace it is preferred to utilize the openings provided for the electrodes in the roof of the reduction chamber, said openings being enlarged.

Hereby it is avoided that the said furnace roof is weakened by further openings and at the same time the charge is introduced just at the place where the smelting proceeds most quickly.

The tightening about the electrode conveniently may take place by means of loose chamotte plates or the like, covered by a layer of a pulverized material 9 preferably pulverized charge or a pulverized ingredient of the charge. The feeding of the charge along the floors of the several compartments to the outlet openings may preferably take place by means of cooled conveyor-screws 10.

Claims:—

1. A furnace of the character described comprising essentially three superposed communicating chambers, the uppermost chamber constituting a preliminary drying chamber, the intermediate chamber constituting a preheating chamber, and the bottom chamber constituting a reduction chamber, said drying chamber being constructed to be heated by the combustion gases from the intermediate chamber, means for heating the last-named chamber, and an electrode extending down through the two uppermost chambers into the bottom chamber for the purpose of electrically heating the latter.

2. A furnace of the character described comprising superposed communicating chambers, the uppermost chamber constituting a preliminary drying chamber, the intermediate chamber constituting a preheating chamber, and the bottom chamber constituting a reduction chamber, said drying chamber being constructed to be heated by the combustion gases from the intermediate chamber, said drying and preheating chambers each comprising a plurality of superposed compartments, means for heating the intermediate chamber, and an electrode extending down through the two uppermost chambers into the bottom chamber for the purpose of electrically heating the latter.

3. A furnace of the character described comprising essentially three superposed communicating chambers, the uppermost chamber constituting a preliminary drying chamber, the intermediate chamber constituting a preheating chamber, and the bottom chamber constituting a reduction chamber, said drying chamber being constructed to be heated by the combustion gases from the intermediate chamber, means for heating the last-named chamber, an electrode extending down through the two uppermost chambers into the bottom chamber, and a sleeve enclosing the electrode for protecting the same against the influence of the flame.

4. A furnace of the character described comprising three superposed communicating chambers, the uppermost chamber constituting a preliminary drying chamber, the intermediate chamber constituting a preheating chamber, and the bottom chamber constituting a reduction chamber, said drying chamber being constructed to be heated by the combustion gases from the intermediate chamber, means for heating the last-named chamber, and an electrode extending down through the two uppermost chambers into the bottom chamber, the roof of the bottom chamber having an opening surrounding the electrode which opening serves as a feeding opening for the charge into the reduction chamber.

5. A furnace of the character described comprising three superposed communicating chambers, the uppermost chamber constituting a preliminary drying chamber, the intermediate chamber constituting a preheating chamber, and the bottom chamber constituting a reduction chamber, said drying chamber being constructed to be heated by the combustion gases from the intermediate chamber, means for heating the last-named chamber, an electrode extending down through the two uppermost chambers into the bottom chamber, and pulverized material within the space surrounding the electrode for the purpose of making the electrode opening gas-tight.

6. A furnace of the character described comprising three superposed communicating chambers, the uppermost chamber constituting a preliminary drying chamber, the intermediate chamber constituting a preheating chamber, and the bottom chamber constituting a reduction chamber, said drying chamber being constructed to be heated by the combustion gases from the intermediate chamber, means for heating the last-named chamber, an electrode extending down through the two uppermost chambers into the bottom chamber, and cooled conveyor screws located on the floors of the several chambers for feeding the charge successively through the several chambers as set forth.

In testimony that I claim the foregoing as my invention, I have signed my name in presence of two subscribing witnesses.

BJÖRN RÆDER.

Witnesses:
NATH. A. HEDENCHOU,
ROBERT H. FRAZIER.